United States Patent Office 3,096,318
Patented July 2, 1963

3,096,318
BENZOTHIAZOLE AZO β-NAPHTHOL DYE COMPOUNDS
James M. Straley, John G. Fisher, and Raymond C. Harris, Kingsport, Tenn., assignors to Eastman Kodak Company, Rochester, N.Y., a corporation of New Jersey
No Drawing. Filed Jan. 18, 1960, Ser. No. 2,827
10 Claims. (Cl. 260—146)

This invention relates to certain metallized and non-metallized benzothiazole azo β-naphthol compounds, devoid of a water-solubilizing group, and their application for the dyeing or coloring of acrylonitrile polymers, especially textile materials prepared from said polymers.

More particularly, the azo compounds of our invention consist of the monoazo compounds having the formula:

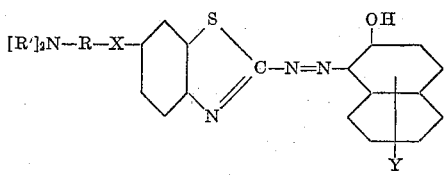

wherein R represents an alkylene radical having 2 to 3 carbon atoms, R' represents an alkyl radical having 1 to 4 carbon atoms, X represents a member selected from the group consisting of a thio radical and a sulfonyl radical, $N[R']_2$ collectively represents a member selected from the group consisting of the morpholinyl and piperidyl radicals and Y represents a member selected from the group consisting of a hydrogen atom, a halogen atom, the sulfamyl group, a $$-SO_2N\overset{H}{\text{alkyl}}$$

group, a $-SO_2N(\text{alkyl})_2$ group, a $$-CON\overset{H}{\text{alkyl}}$$

group, a $-CON(\text{alkyl})_2$ group or a $$-CONR_1\overset{H}{}$$

group, wherein $R_1$ represents a monocyclic aryl nucleus of the benzene series and wherein alkyl as used herein represents an alkyl radical having 1 to 4 carbon atoms and their metal complexes containing a metal selected from the group consisting of cobalt, nickel and chromium, said azo compounds being devoid of a water-solubilizing group.

The non-metallized azo compounds of our invention are prepared by diazotizing a 2-aminobenzothiazole compound having the formula:

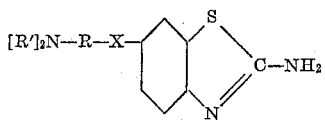

wherein R, R', X and $N[R']_2$ collectively have the meaning previously assigned to them and coupling the diazonium compound obtained with a β-naphthol compound having the formula:

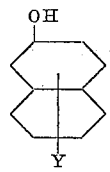

wherein Y is as defined hereinbefore. The non-metallized azo compounds can be metallized either on or off the materials they color. Metalization can be carried out, for example, by heating the non-metallized azo compound with a solution or dispersion of the metallizing agent. In the metallized azo compounds of our invention the metal and the monoazo compound are combined in the ratio of about one atom of metal to two molecules of the monoazo compound. The metallized azo compounds are referred to herein as 1:2 metal complexes. The manner in which metallization can be carried out is fully described hereinafter.

Nickel chloride, nickel bromide, nickel sulfate, nickel acetate, nickel formate, nickel thiocyanate $[Ni(SCN)_2]$, cobaltous bromide, cobaltic chloride, cobaltous chloride, cobaltous acetate, cobalt thiocyanate $[Co(SCN)_2]$, chromium trichloride, chromium tribromide, chromic sulfate, chromic acetate and chromium thiocyanate $[Cr(SCN)_3]$, for example, are illustrative of the metallizing agents that can be employed.

Both the non-metallized and the metallized azo compounds of our invention can be applied to polyacrylonitrile textile materials in the form of an aqueous dispersion. Coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then treated in a dyebath containing one or more of the non-metallized azo compounds to form the metal complex on the fiber.

The non-metallized monoazo compounds yield red to violet shades on polyacrylonitrile materials. The metallized compounds yield fast blue to violet shades on polyacrylonitrile materials, such as acrylic fibers. The metallized dyeings have better fastness to washing than the corresponding non-metallized dyeings and frequently have improved fastness to light. Among the acrylonitrile polymers that can be dyed or colored with the non-metallized and metallized azo compounds of our invention are those disclosed in Straley and Giles U.S. Patent 2,857,372 issued October 21, 1958.

2-amino-6-β-dimethylaminoethylthiobenzothiazole,
2-amino-6-β-diethylaminoethylthiobenzothiazole,
2-amino-6-β-di-n-propylaminoethylthiobenzothiazole,
2-amino-6-β-di-n-butylaminoethylthiobenzothiazole,
2-amino-6-γ-dimethylaminopropylthiobenzothiazole,
2-amino-6-γ-diethylaminopropylthiobenzothiazole,
2-amino-6-γ-di-n-propylaminopropylthiobenzothiazole,
2-amino-6-γ-di-n-butylaminopropylthiobenzothiazole,
2-amino-6-(β-dimethylamino-α-methylethylthio)benzothiazole,
2-amino-6-(β-diethylamino-α-methylethylthio)benzothiazole,
2-amino-6-β-piperidylethylthiobenzothiazole,
2-amino-6-γ-piperidylpropylthiobenzothiazole,
2-amino-6-β-morpholinylethylthiobenzothiazole,
2-amino-6-γ-morpholinylpropylthiobenzothiazole and the corresponding sulfonylbenzothiazole compounds such as 2-amino-6-β-dimethylaminoethylsulfonylbenzothiazole,
2-amino-6-β-diethylaminoethylsulfonylbenzothiazole,
2-amino-6-β-di-n-propylaminoethylsulfonylbenzothiazole,
2-amino-6-β-di-n-butylaminoethylsulfonylbenzothiazole,
2-amino-6-γ-dimethylaminopropylsulfonylbenzothiazole,
2-amino-6-γ-diethylaminopropylsulfonylbenzothiazole,
2-amino-6-γ-di-n-butylaminopropylsulfonylbenzothiazole,
2-amino-6-(β-dimethylamino-α-methylethylsulfonyl)benzothiazole, 2-amino-6-β-piperidylethylsulfonylbenzothiazole,
2-amino-6-γ-piperidylpropylsulfonylbenzothiazole,
2-amino-6-β-morpholinylethylsulfonylbenzothiazole, and
2-amino-6-γ-morpholinylpropylsulfonylbenzothiazole,
for example, are illustrative of the 2-aminobenzothiazole compounds used in the preparation of the azo compounds of our invention.

The following examples illustrate the invention.

Example 1

12.65 grams of 2-amino-6-β-dimethylaminoethylthiobenzothiazole were dissolved in 120 cc. of water containing 70 cc. of 96% $H_2SO_4$. To this solution was added, with stirring, at 0° C. nitrosylsulfuric acid prepared from 3.9 grams of sodium nitrite in 25 cc. of 96% $H_2SO_4$. The reaction mixture thus obtained was stirred 2 hours longer while maintaining the temperature below 5° C. The diazonium solution thus prepared was added slowly to a solution of 7 grams of β-naphthol in 100 cc. of 2% aqueous NaOH and the temperature was kept below 10° C. by the intermittent addition of ice. The mineral acid present was neutralized with sodium carbonate and then the reaction mixture was stirred for 2 hours longer. The dye compound formed was recovered by filtration, washed with water and dried. It has the formula:

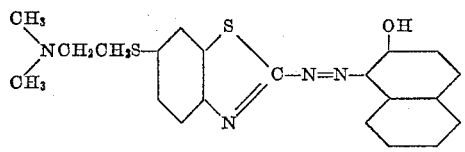

and colors acrylic fibers brownish-red shades. The 1:2 nickel complex of this dye compound yields fast blue dyeings on acrylic fibers such as Orlon 42 and Verel, as do the 1:2 cobalt and 1:2 chromium complexes.

Example 2

10.25 grams of 2-amino-6-γ-diethylaminopropylthiobenzothiazole were added to 25 cc. of water and 37 cc. of 96% sulfuric acid and stirred below 50° C. to complete solution. 5 cc. of 30% $H_2O_2$ were added at 50–60° C. and then the reaction mixture was raised to 90° C., maintained at this temperature for 1 hour and cooled. 12 cc. of 96% sulfuric acid and 60 grams of ice were added. A nitrosyl sulfuric acid solution prepared from 2.6 grams of sodium nitrite and 17.6 cc. of 96% sulfuric acid was added, with stirring, at 0–5° C. and the reaction mixture was maintained at this temperature for 3 hours. The diazonium solution thus prepared was added below 5° C. to a solution of 5.1 grams of β-naphthol in 200 cc. of 2% aqueous sodium hydroxide. After 2 hours the reaction mixture was made strongly basic with ammonium hydroxide. The solid reaction product which precipitated was recovered by filtration, washed with water and air-dried. 1-[6'-γ-diethylaminopropylsulfonyl-benzothiazole-2'-azo]-2-naphthol, having the formula:

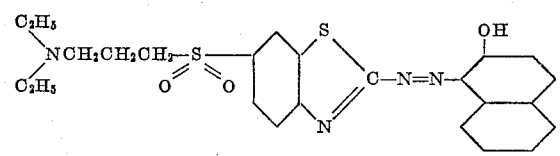

was obtained. It colors acrylic fibers such as Orlon 42 and Verel red shades. The 1:2 nickel, the 1:2 cobalt and the 1:2 chromium complexes of this dye compound yield fast violet shades on Verel and Orlon 42 acrylic fibers. Metallization can be effected either on or off the fiber.

Example 3

One gram of the non-metallized azo compound of Example 1, 15 cc. of acetone and 2 cc. of 28% aqueous ammonium hydroxide were refluxed together and a solution of 0.7 gram of $Ni(OOCCH_3)_2 \cdot 4H_2O$ in 15 cc. of 50% aqueous acetone was added over a period of 15 minutes. Refluxing was continued for three hours, while stirring, after which the reaction mixture was poured into 400 cc. of water and the temperature brought to 80° C. 20 grams of sodium chloride were added, with stirring, and then the reaction mixture was cooled to room temperature. The metallized dye product, a 1:2 nickel complex in which nickel and the monoazo compound of Example 1 are combined in the ratio of about one atom of nickel to two molecules of the monoazo compound, which precipitated was recovered by filtration, washed with a 5% aqueous sodium chloride solution and air-dried. It dyes acrylic fibers such as Verel and Orlon 42 blue shades which have good fastness to light, washing and gas.

Example 4

A polyacrylonitrile textile fabric dyed red with a 1% dyeing (by weight of pure dye) of the dye product of Example 1 was padded with a 3% aqueous solution of nickel thiocyanate under conditions such that a 60 to 100% pick up, based on the weight of the fabric, was obtained. The polyacrylonitrile fabric was then aged in a steam chest under 5 p.s.i. pressure for 10 minutes after which it was scoured at 60° C. with soap and water, rinsed well with water and dried. A 1:2 metal complex in which nickel and the monoazo compound of Example 1 are combined in the ratio of about one atom of nickel to two molecules of the monoazo compound is formed in situ on the polyacrylonitrile fabric being dyed. The polyacrylonitrile fabric was dyed a blue shade having good fastness to light, washing and gas.

When the above example is repeated using a 3% aqueous solution of cobalt thiocyanate or chromium thiocyanate in place of the nickel thiocyanate solution, the polyacrylonitrile fabric is likewise dyed a blue shade having good fastness to light, washing and gas. The 1:2 cobalt complex and the 1:2 chromium complex, respectively, of the monoazo compound of Example 1 are formed in situ on the polyacrylonitrile fabric being dyed.

Example 5

Example 1 was repeated using 14.05 grams of 2-amino-6-β-diethylaminoethylthiobenzothiazole in place of 2-amino-6-β-dimethylaminoethylthiobenzothiazole. The dye compound obtained dyed polyacryonitrile textile fabrics dull red shades. When it is metallized on a polyacrylonitrile fiber, such as Verel or Orlon 42, for example, with nickel or cobalt thiocyanate, for example, blue shades having good fastness to light, gas and washing are obtained. In each instance a 1:2 metal complex is formed in situ on the polyacrylonitrile fabric being dyed.

Example 6

Example 1 was repeated using 14.75 grams of 2-amino-6-γ-diethylaminopropylthiobenzothiazole in place of 2-amino-6-β-dimethylaminoethylthiobenzothiazole. The dye compound obtained dyed polyacrylonitrile textile fabrics dull red shades. When it is metallized on a polyacrylonitrile fiber, such as Verel or Orlon 42, for example, with nickel or cobalt thiocyanate, for example, blue shades having good fastness to light, gas and washing are obtained. In each instance a 1:2 metal complex is formed in situ on the polyacrylonitrile fabric being dyed.

Example 7

Example 1 was repeated using 13.35 grams of 2-amino-6-γ-dimethylaminopropylthiobenzothiazole in place of 2-amino-6-β-dimethylaminoethylthiobenzothiazole. The dye compound obtained dyed polyacrylonitrile textile fabrics dull red shades. When it is metallized on a polyacrylonitrile fiber, such as Verel or Orlon 42, for example, with nickel or cobalt thiocyanate, for example, blue shades having good fastness to light, gas, and washing are obtained. In each instance a 1:2 metal complex is formed in situ on the polyacrylonitrile fabric being dyed.

Example 8

Example 1 was repeated using 13.35 grams of 2-amino-6-β-dimethylamino - α - methylethylthiobenzothiazole in place of 2-amino-6-β-dimethylaminoethylthiobenzothiazole. The dye compound obtained dyed polyacrylonitrile textile fabrics red shades. When it is metallized on a polyacrylonitrile fiber, such as Verel or Orlon 42, for example, with nickel or cobalt thiocyanate, for example, blue shades having good fastness to light, gas and washing are obtained. In each instance a 1:2 metal complex is formed in situ on the polyacrylonitrile fabric being dyed.

Example 9

2.93 grams of 2-amino-6-γ-diethylaminopropylthiobenzothiazole were dissolved in 24 cc. of water and 14 cc. of 96% $H_2SO_4$. 0.72 gram of sodium nitrite in 5 cc. of 96% $H_2SO_4$ were added, with stirring, at 0–10° C. The resulting reaction mixture was stirred below 5° C. for 2 hours and then added to a solution of 2.93 grams of the o-methoxyanilide of 2-hydroxy-3-naphthoic acid in 50 cc. of water containing 3 grams of sodium hydroxide, the temperature being kept below 10° C. by the addition of ice. After 2 hours' stirring, without further cooling, the acid present was neutralized with $Na_2CO_3$. The dye compound which precipitated was recovered by filtration, washed with cold water and dried at 60° C. It colors polyacrylonitrile violet shades. The 1:2 nickel and the 1:2 cobalt complexes of this dye color acrylic fibers such as Verel and Orlon 42 blue shades having good fastness to light, gas and washing. The 1:2 chromium complex yields blue-violet shades on said fibers.

Example 10

2.93 grams of 2-amino-6-β-piperidylethylthiobenzothiazole were diazotized and the diazonium compound obtained was coupled with 2.52 grams of N,N-dimethyl-2-hydroxynaphthalene-6-sulfonamide. Diazotization, coupling and recovery of the dye compound formed were carried out in accordance with the procedure described in Example 9. The dye compound obtained colors polyacrylonitrile red shades. The 1:2 nickel and the 1:2 cobalt complexes of this dye color acrylic fibers such as Verel and Orlon 42 blue shades having good fastness to light, gas and washing. The 1:2 chromium complex yields violet shades on said fibers.

Example 11

2.8 grams of 2-amino-6-β-diethylaminoethylthiobenzothiazole were diazotized and the diazonium compound obtained was coupled with 2.24 grams of 6-bromo-2-naphthol. Diazotization, coupling and recovery of the dye compound formed were carried out in accordance with the procedure described in Example 9. The dye compound obtained colors polyacrylonitrile red shades. The 1:2 nickel and the 1:2 cobalt complexes of this dye color acrylic fibers such as Verel and Orlon 42 blue shades having good fastness to light, gas and washing. The 1:2 chromium complex yields violet shades on said fibers.

The following tabulation further illustrates the azo compounds that can be prepared from the 2-aminobenzothiazole compounds of our invention and sets forth (1) the colors the non-metallized azo compounds yield on polyacrylonitrile textile fabrics made of Orlon 42 or Verel acrylic fiber and (2) the colors obtained when the non-metallized dyeings are metallized with nickel thiocyanate to obtain the 1:2 nickel complex in situ on the polyacrylonitrile textile material being dyed. "Original" refers to the non-metallized dyeing and "Final" refers to the metallized dyeing.

| 2-Aminobenzothiazole Compound | Coupler | Color Original | Color Final |
|---|---|---|---|
| 6-β-di-n-butylamino-ethylthio. | β-naphthol | red | blue. |
| 6-β-di-n-butylamino-ethylsulfonyl. | 6-bromo-2-naphthol | do | Do. |
| 6-β-dimethylamino-ethylsulfonyl. | β-naphthol | do | Do. |
| 6-β-dimethylamino-ethylthio. | H<br>3-CONCH₃-2-naphthol. | do | Do. |
| Do | 3-CON(C₂H₅)₂-2-naphthol. | do | Do. |
| Do | 3-CON(n-C₄H₉)₂-2-naphthol. | do | Do. |
| Do | 6-sulfamyl-2-naphthol | do | Do. |
| Do | 6-SO₂N(n-C₄H₉)₂-2-naphthol. | do | Do. |
| Do | H<br>6-SO₂NCH₃-2-naphthol. | do | Do. |
| Do | H<br>6-SO₂NC₂H₅-2-naphthol. | do | Do. |
| Do | H<br>6-SO₂N(n-C₄H₉)-2-naphthol. | do | Do. |
| 6-β-di-n-propylamino-ethylthio. | β-naphthol | do | Do. |
| 6-β-piperidyl-ethylthio | do | do | Do. |
| 6-γ-piperidyl-propylthio | do | do | Do. |
| 6-β-piperidyl-ethyl-sulfonyl. | do | do | violet. |
| 6-γ-piperidyl-propyl-sulfonyl. | H<br>3-CON-phenyl-2-naphthol. | do | reddish-blue. |
| 6-β-morpholinyl-ethyl thio. | β-naphthol | do | blue. |
| 6-β-morpholinyl-ethyl-sulfonyl. | do | do | violet. |
| 6-γ-morpholinyl-propylthio. | do | do | blue. |
| 6-γ-morpholinyl-propylsulfonyl. | do | do | violet. |

The non-metallized azo compounds disclosed in the foregoing tabulation can also be metallized with a suitable cobalt or chromium metallizing agent, especially cobalt thiocyanate and chromium thiocyanate, to form the 1:2 cobalt and the 1:2 chromium complexes thereof. The 1:2 cobalt complexes yield about the same colors as the corresponding 1:2 nickel complexes. In the case of the 1:2 chromium complexes the color is ordinarily redder. As previously noted metallization can be effected either on or off the fiber.

The 2-aminobenzothiazole compounds used in preparing the azo compounds of our invention are new compounds. They are described and claimed in copending Straley and Fisher U.S. application Serial No. 2,869, filed January 18, 1960, now abandoned.

The 2-aminobenzothiazole compounds wherein X is a thio radical can be prepared by reacting the hydrochloride salt form of a compound having the formula:

$$[R']_2N\text{—}R\text{—}Z$$

wherein R, R' and N[R']₂ have the meaning previously assigned to them and Z represents a chlorine or bromine atom with 2-amino-6-mercaptobenzothiazole or its alkali metal salts. The non-salt form of the compounds having the formula:

$$[R']_2N\text{—}R\text{—}Z$$

can be employed but inasmuch as these compounds are more easily prepared in their salt form, such as the hydrochloride salt form, the use of the hydrochloride salt form is shown in the examples given hereinafter.

2-amino - 6 - mercaptobenzothiazole is a known compound. It can be prepared by reacting 2-amino-6-thiocyanobenzothiazole with sodium sulfide. As shown hereinafter the 2-amino-6-mercaptobenzothiazole thus formed can be used, in situ, without being separately isolated.

The 2-aminobenzothiazole compounds wherein X is a sulfonyl radical can be prepared by reacting the corresponding compounds wherein X is a thio radical with hydrogen peroxide in an acid medium.

The following examples illustrate the preparation of the 2-aminobenzothiazole compounds.

Example 12

68.4 grams of 2-amino-6-thiocyanobenzothiazole, 160 grams of $Na_2S \cdot 9H_2O$ and 700 cc. of water were refluxed together for ten minutes. A solution of 57.1 grams of the hydrochloride of γ-dimethylaminopropyl chloride

and 27.8 grams of $NaHCO_3$ in 400 cc. of water was added over a period of about 15 minutes. Refluxing was continued for one hour further after which the reaction mixture was allowed to stand overnight. The reaction product which precipitated was recovered by filtration, washed with cold water and air-dried. 69.4 grams of 2-amino-6-γ-dimethylaminopropylthiobenzothiazole having the formula:

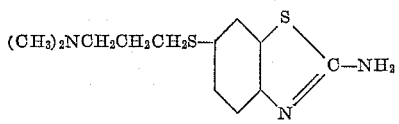

and melting at 113.5–116° C. were thus obtained.

Example 13

Example 12 was repeated using 57.8 grams of 2-diethylaminoethyl chloride hydrochloride in place of γ-dimethylaminopropyl chloride hydrochloride. 71 grams of 2-amino-6-β-diethylaminoethylthiobenzothiazole melting at 92–94° C. were obtained.

Example 14

10 grams of 2-amino-6-β-diethylaminoethylthiobenzothiazole were slurried in 10 cc. of glacial acetic acid. Ten cc. of 30% $H_2O_2$ were added portionwise. The temperature rose to 100° C. when about half the $H_2O_2$ had been added. The reaction mixture was then cooled to 55° C. and the remainder of the $H_2O_2$ was gradually added. After all the $H_2O_2$ had been added the reaction mixture was allowed to stand at room temperature until the formation of crystals ceased. The reaction product was recovered by filtration and recrystallized from ethanol. 2-amino-6-β-diethylaminoethylsulfonylbenzothiazole was thus obtained in the form of white crystals melting at 57.5–58.5° C.

The procedure set forth in Example 14 is of general applicability for the preparation of the compounds of our invention wherein X is a sulfonyl radical.

Example 15

Example 12 was repeated using 52.8 grams of 2-dimethylaminoethyl chloride hydrochloride in place of γ-dimethylamino-propyl chloride hydrochloride. 2-amino-6-β-dimethylaminoethyl thiobenzothiazole melting at 110–112° C. was obtained.

Example 16

The general procedure set forth in Example 12 was followed using β-dimethylamino-α-methylethyl chloride hydrochloride in place of γ-dimethylaminopropyl chloride hydrochloride. 2-amino-6-β-dimethylamino-α-methylethylthiobenzothiazole was obtained as a gummy solid.

Example 17

The general procedure set forth in Example 12 was followed using β-piperidylethyl chloride hydrochloride in place of γ-dimethylaminopropyl chloride hydrochloride. 2-amino-6-β-piperidylethylthiobenzothiazole having the formula:

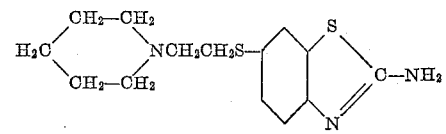

was obtained as a solid melting at 78–81° C.

Example 18

The general procedure set forth in Example 12 was followed using β-morpholinylethyl chloride hydrochloride in place of γ-dimethylaminopropyl chloride hydrochloride. 2-amino-6-β-morpholinylethylthiobenzothiazole was obtained as a solid melting at 71–73°.

Example 19

The general procedure set forth in Example 12 was followed using γ-diethylaminopropyl chloride hydrochloride in place of γ-dimethylaminopropyl chloride hydrochloride 2-amino-6-γ-diethylaminopropylthiobenzothiazole was obtained as a solid melting at 82–84° C.

Example 20

The general procedure set forth in Example 12 was followed using γ-di-n-propylaminopropyl chloride hydrochloride in place of γ-dimethylaminopropyl chloride hydrochloride. 2-amino-6-γ-n-propylaminopropylthiobenzothiazole was obtained as a gummy solid.

Example 21

The general procedure set forth in Example 12 was followed using β-di-n-butylaminoethyl chloride hydrochloride in place of γ-dimethylaminopropyl chloride hydrochloride. 2-amino-6-β-di-n-butylaminoethylthiobenzothiazole was obtained as a gummy solid.

In using the compounds of our invention wherein X is a sulfonyl radical we prefer to make and use them without isolation. This procedure is illustrated in Example 2.

Following the directions given herein 2-amino-6-β-di-n-propylaminoethylthiobenzothiazole, 2-amino-6-γ-di-n-butylaminopropylthiobenzothiazole, 2-amino-6-β-diethylamino-α-methylethylthiobenzothiazole, 2-amino-6-γ-piperidyl-propylthiobenzothiazole, 2-amino-6-γ-morpholinylpropylthiobenzothiazole, 2-amino-6-β-dimethylaminoethylsulfonylbenzothiazole, 2-amino-6-γ-dimethylaminopropylsulfonylbenzothiazole, 2-amino-6-γ-diethylaminopropylsulfonylbenzothiazole, 2-amino-6-β-di-n-propylaminoethylsulfonylbenzothiazole and 2-amino-6-β-di-n-butylaminoethylsulfonylbenzothiazole, for example, can also be prepared.

The non-metallized and metallized azo compounds described herein can be applied to acrylonitrile polymers, such as polyacrylonitrile and acrylonitrile graft polymers, in the form of an aqueous dispersion.

The following example illustrates one satisfactory way in which the non-metallized azo compounds can be used to dye an acrylonitrile polymer textile material. .1 gram of dye is dissolved by warming in 6 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried. The metallized dyeing can be obtained in accordance with the procedure described in Example 4. A 3% solution of a salt, other than the thiocyanate salt, can be used. However, we have found the use of the thiocyanates of nickel, cobalt and chromium to be particularly advantageous.

The premetallized azo dyes can be applied in the same general manner as the non-metallized azo dyes. However, in order to mitigate the possibility of demetallization during dyeing 5 cc. of a 5% aqueous solution of a weak acid such as boric acid is used instead of formic acid or acetic acid. Except for this change the dyeing conditions are the same.

The non-metallized and metallized azo compounds described herein are devoid of water solubilizing groups such as the carboxylic acid and the sulfonic acid groups. Any other suitable method known to the art can be used to apply them to acrylonitrile polymeric materials.

The dyeings obtained with the chromium complexes tend to be redder than those obtained with the nickel and cobalt complexes.

The invention has been described in detail with particular reference to preferred embodiments thereof, but it will be understood that variations and modifications can be effected within the spirit and scope of the invention as described hereinabove and as defined in the appended claims.

We claim:
1. The azo compounds selected from the group consisting of the monoazo compounds having the formula:

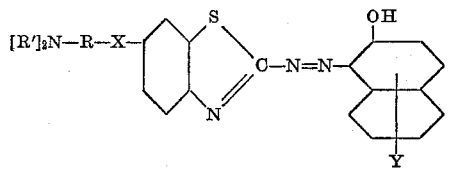

wherein R represents an alkylene radical having 2 to 3 carbon atoms, R' represents an alkyl radical having 1 to 4 carbon atoms, X represents a member selected from the group consisting of a thio radical and a sulfonyl radical, N[R']₂ collectively represents a member selected from the group consisting of the morpholinyl and piperidyl radicals and Y represents a member selected from the group consisting of a hydrogen atom, a bromine atom, the sulfamyl group, a

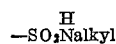

group, a —SO₂N(alkyl)₂ group, a

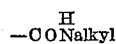

group, a —CON(alkyl)₂ group and a

group, wherein R₁ represents a member selected from the group consisting of a phenyl group and a methoxyphenyl group and wherein alkyl as used herein represents an alkyl radical having 1 to 4 carbon atoms and their 1:2 metal complexes containing a metal selected from the group consisting of cobalt, nickel and chromium, said azo compounds being devoid of a water-solubilizing group.

2. Compounds according to claim 1 wherein X is a thio radical.
3. Compounds according to claim 1 wherein Y is a hydrogen atom.
4. The non-metallized monoazo compounds having the formula set forth in claim 1.
5. The 1:2 nickel complex form of the monoazo compounds having the formula set forth in claim 1.
6. The azo compound having the formula:

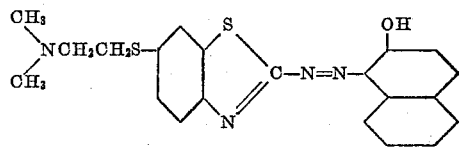

7. The 1:2 nickel complex of the azo compound set forth in claim 6.
8. The azo compound having the formula:

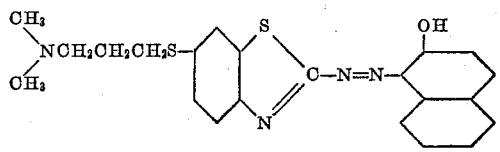

9. The azo compound having the formula:

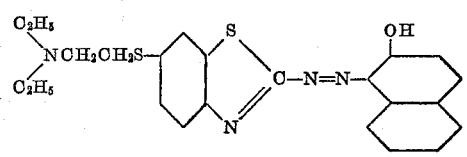

10. The azo compound having the formula:

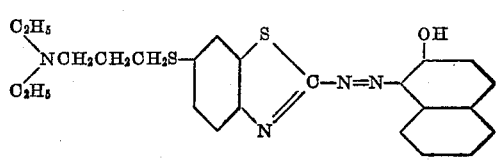

References Cited in the file of this patent
UNITED STATES PATENTS

| | | |
|---|---|---|
| 2,128,256 | Krzikalla et al. | Aug. 30, 1938 |
| 2,402,538 | Dreyfus | June 25, 1946 |
| 2,868,774 | Straley et al. | Jan. 13, 1959 |
| 2,875,190 | Straley et al. | Feb. 24, 1959 |
| 2,916,482 | Straley et al. | Dec. 8, 1959 |